United States Patent
Krishnan

(10) Patent No.: US 6,366,956 B1
(45) Date of Patent: *Apr. 2, 2002

(54) RELEVANCE ACCESS OF INTERNET INFORMATION SERVICES

(75) Inventor: Murali R. Krishnan, Bellevue, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,693

(22) Filed: Jan. 29, 1997

(51) Int. Cl.⁷ ..................... G06F 15/173; G06F 15/167
(52) U.S. Cl. ........................................ 709/223; 707/4
(58) Field of Search ............................. 707/103, 10, 7, 707/2, 513, 3, 512.4; 345/327, 356; 709/231, 224, 208, 204, 217, 218, 223, 201, 219; 705/2, 10, 26; 379/167, 88.22

(56) References Cited

U.S. PATENT DOCUMENTS

| | | | | |
|---|---|---|---|---|
| 5,263,165 A | * | 11/1993 | Janis | 711/163 |
| 5,617,565 A | * | 4/1997 | Augenbraun et al. | 707/4 |
| 5,710,884 A | * | 1/1998 | Dedrick | 709/217 |
| 5,717,923 A | * | 2/1998 | Dedrick | 707/102 |
| 5,754,938 A | | 5/1998 | Herz et al. | 455/4.2 |
| 5,754,939 A | | 5/1998 | Herz et al. | 455/4.2 |
| 5,758,072 A | * | 5/1998 | Filepp et al. | 709/208 |
| 5,758,257 A | | 5/1998 | Herz et al. | 455/2 |
| 5,774,671 A | * | 6/1998 | Satoh | 709/231 |
| 5,778,367 A | * | 7/1998 | Wesinger, Jr. et al. | 707/10 |
| 5,787,253 A | * | 7/1998 | McCreery et al. | 709/231 |
| 5,832,474 A | * | 11/1998 | Lopersti et al. | 707/2 |
| 5,835,087 A | * | 11/1998 | Herz et al. | 345/327 |
| 5,848,396 A | * | 12/1998 | Gerace | 705/10 |
| 5,864,863 A | * | 1/1999 | Burrows | 707/103 |
| 5,867,821 A | * | 2/1999 | Ballantyne et al. | 705/2 |
| 5,881,142 A | * | 3/1999 | Frankel et al. | 379/167 |
| 5,884,309 A | * | 3/1999 | Vanechanos, Jr. | 707/10 |
| 5,892,917 A | * | 4/1999 | Myerson | 709/224 |
| 5,907,837 A | * | 5/1999 | Ferrel et al. | 707/3 |
| 5,915,001 A | * | 6/1999 | Uppaluru | 379/88.22 |
| 5,931,907 A | * | 8/1999 | Davies et al. | 709/218 |
| 5,956,716 A | * | 9/1999 | Kenner et al. | 707/10 |
| 5,958,006 A | * | 9/1999 | Eggleston et al. | 709/219 |
| 5,966,695 A | * | 10/1999 | Melchione et al. | 705/10 |
| 5,974,446 A | * | 10/1999 | Sonnenreich et al. | 709/204 |
| 5,991,798 A | * | 11/1999 | Ozaki et al. | 709/217 |
| 6,029,195 A | | 2/2000 | Herz | 709/219 |
| 6,119,135 A | * | 9/2000 | Helfman | 707/513 |

OTHER PUBLICATIONS

Ywono et al. WISE: A World Wide Web resource Database System IEEE, 1996.*
Published 1996 by Microsoft on the World Wide Web at Microsoft.com.

* cited by examiner

*Primary Examiner*—Mark H. Rinehart
*Assistant Examiner*—Thong Vu
(74) *Attorney, Agent, or Firm*—Lee & Hayes, PLLC

(57) ABSTRACT

The information access monitor is located at the Internet gateway of a network. The information access monitor monitors information flows between the internal data communication network and Internet to identify information requests and responses. The Information Access Monitor generates relevance indexes for these requests and responses and compiles a "corporate consciousness" of all data relevant to the organization. The information access monitor computes user/group profiles to identify information needs and interests within the organization and can then automatically associate users/groups with information of relevance. The users can be advised of information via automated "copy to" lists or can be directed to information in response to the user seeking information. The information accessmonitor thereby automatically creates "virtual bibliographies" which reflect topics of interest to the users of the system. These virtual bibliographies are continuously created and updated as needed by the users.

10 Claims, 5 Drawing Sheets

RELEVANCE ACCESS OF INTERNET INFORMATION SERVICES

FIELD OF THE INVENTION

This invention relates to data access systems which enable users to access data from remotely located data storage subsystems and, in particular, to an information access monitor which ascertains patterns of data access by the users and automatically compiles data for the users based upon the relevance of this information to the users—interests, as indicated by prior patterns of data access by the users.

1. Problem

In a multiuser computer environment, such as on a corporate network, information is generated and consumed by users in all parts of the organization. As part of this process, many individuals access information via Internet, and store the results of their quest in their personal data storage directories. Much of this information is of interest to others in the organization, yet it is not made available to these interested parties absent the searcher forwarding a copy of this information to the interested parties. In addition, there is also information stored on computers within the organization that the searcher may not identify or be able to access. There presently is no single list of information sources or an identification of the contents of these sources available to the members of the organization. Thus, individuals searching for information replicate in part the prior search efforts of others and also do not necessarily disseminate the retrieved information to all those in the organization who have an interest in this information.

In large organizations, information is generated, distributed, stored and consumed in a manner that fails to ensure that all individuals who have an interest in this information receive copies of the information. Historically, organizations maintained a central library which was the repository of information of a general public nature. In addition, the organization concurrently maintained a corporate records department which stored and maintained the private corporate correspondence and trade secret documents. Thus, when an individual working in the organization desired to obtain information, the search was initially divided between these two types of information. The two libraries of information were cataloged by professional librarians and were relatively simple to search, generally with the assistance of the library staff. With regard to information generated within and by the organization, this information was typically propagated from the author to members of the author's department and to interested individuals in other departments via standard routing lists.

With the advent of computerized sources of information and the availability of electronic media via which the information can be obtained, this traditional library structure has lost its effectiveness. Individual members of an organization can search for information from diverse sources. The access to these sources is typically via "Internet" which is a world wide link of computers that communicate via commonly understood protocols. The Internet also functions as a repository of information published by many sources: libraries, corporations, universities, research institutions, organizations, governments, individuals, and the like. A variety of tools are available to the users to access this information from Internet. However, a problem with Internet is that the "search and locate" functions used to obtain information of interest to a user are non-trivial to execute. In particular, the Internet and the search engines used to locate information which is accessible via Internet are somewhat eclectic at best. The users must expend a significant amount of time and effort to locate and retrieve information from the scattered sources of information. From the organization's point of view, this problem is exacerbated by the fact that numerous members of the organization are redundantly searching for information and storing identical information in their private directories on the organization's data storage subsystems. Thus, the entire information library function has devolved from the professionally run organizational libraries of the past to the distributed, disorganized and grossly inefficient electronic data storage procedures of the present.

Therefore, there presently is no automatic data indexing mechanism available to organizations to address the problem of individual storage of information of relevance to the organization and the absence of any correlation process to enable other members of the organization to benefit from the search efforts of their peers. The information stored on the organization's data storage subsystem is therefore ineffective, even though its availability and pertinence to the organization may be high.

2. Solution

The above described problems are solved and a technical advance achieved in the field by the Information Access Monitor (IAM) of the present invention. In the preferred embodiment of the invention, the information access monitor is part of a computer system comprising a plurality of interconnected processors. The information access monitor is located at the Internet gateway of the computer system's data communication network. Users access information that is pertinent to their work and to others in their organizations by means of the Internet. The information access monitor therefore functions to monitor information flows between the internal data communication network and Internet to identify these information requests and responses. The information access monitor generates relevance indexes for these requests and responses and compiles a "corporate consciousness" of all data relevant to the organization. The information access monitor computes user/group profiles to identify information needs and interests within the organization and can then automatically associate users/groups with information of relevance. The users can be advised of information retrieved from the Internet by others via information access monitor generated relevance indexes, or by "copy to" lists or they can be directed to pertinent information in response to the user seeking information. The information access monitor thereby automatically creates "virtual bibliographies" which reflect topics of interest to the users of the computer system. These virtual bibliographies are continuously created and updated as needed by the users actions in accessing information through the Internet gateway.

In this environment, the monitoring of information accesses enables the computer system to avoid the redundant storage of information, since a single copy of a data file is stored on the computer system's data storage subsystem and is accessible by all users of the computer system. Alternatively, the information management function is implemented by recording the identity of the Internet information source so the information can be reaccessed without the need to retain a copy. It is only the information cataloging and relevance match data that must be created and manipulated to enable efficient access to the information stored on the data storage subsystem and external sources. This data management technique therefore has a significant impact on the amount of data stored in the data storage subsystem.

The automated cataloging of information creates a dynamic and adaptable information storage and retrieval system, since the information storage and retrieval patterns are determined by the users of the computer system. As the users' interests change over time, the information access monitor changes the information dissemination procedure in synchronization with the user' interests. The result of this architecture is that the computer system can efficiently support multiple forms of information retrieval. Documents can be retrieved from the single copy of the document stored in the data storage subsystem. Relevance searches can be executed on the indexing information created by the information access monitor and stored in the computer system. Furthermore, event based data can be stored to record a temporal record of the information retrieval and access activity in the computer system. Additional features that can be supported include document annotation, wherein a user can annotate and forward retrieved documents to other individuals. These capabilities are nowhere found in existing data storage and management systems.

DETAILED DESCRIPTION

Figure 1:
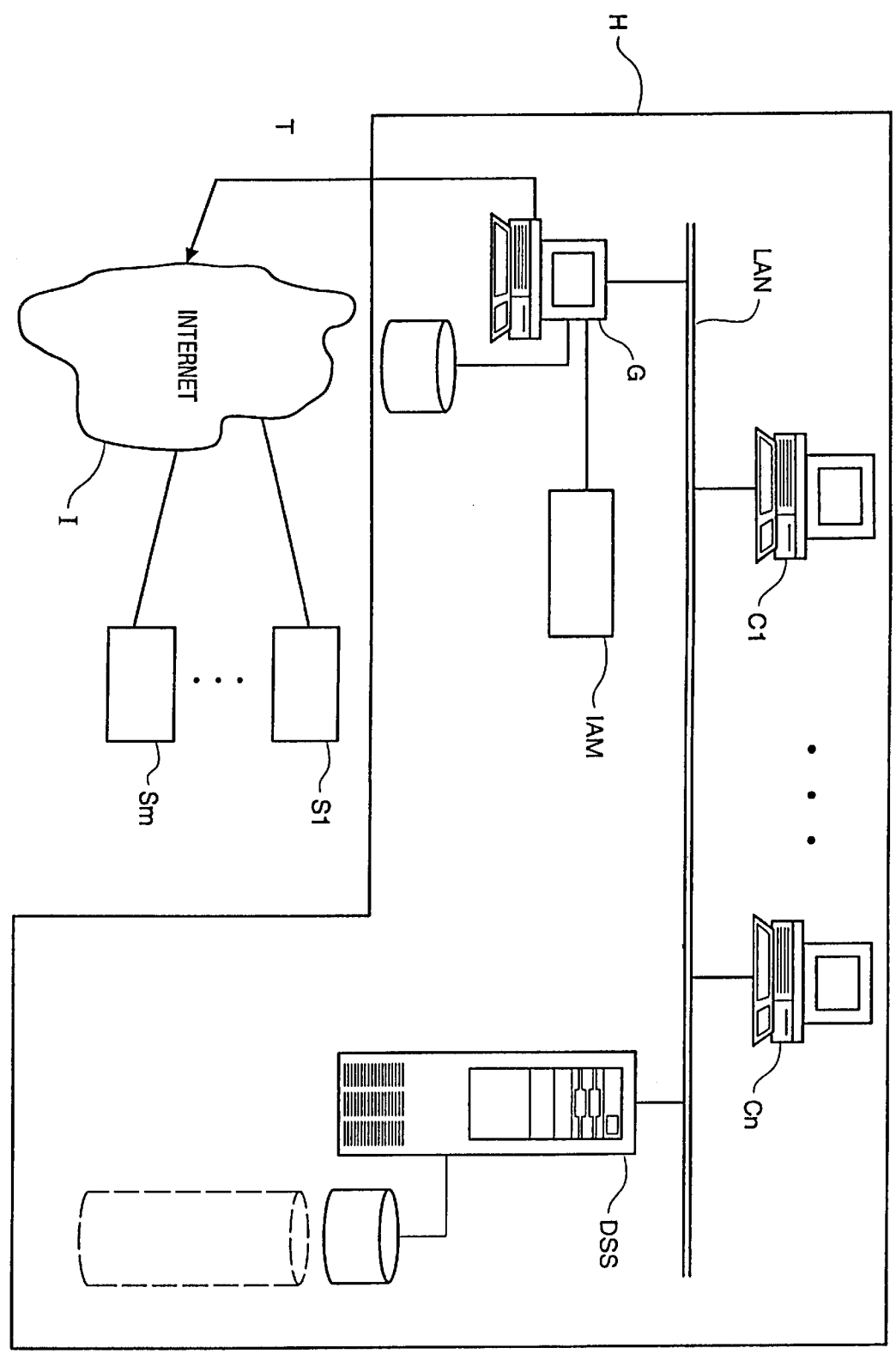
FIG. 1 illustrates a typical architecture of the information access monitor and an environment in which it is typically operational.
Figure 2:
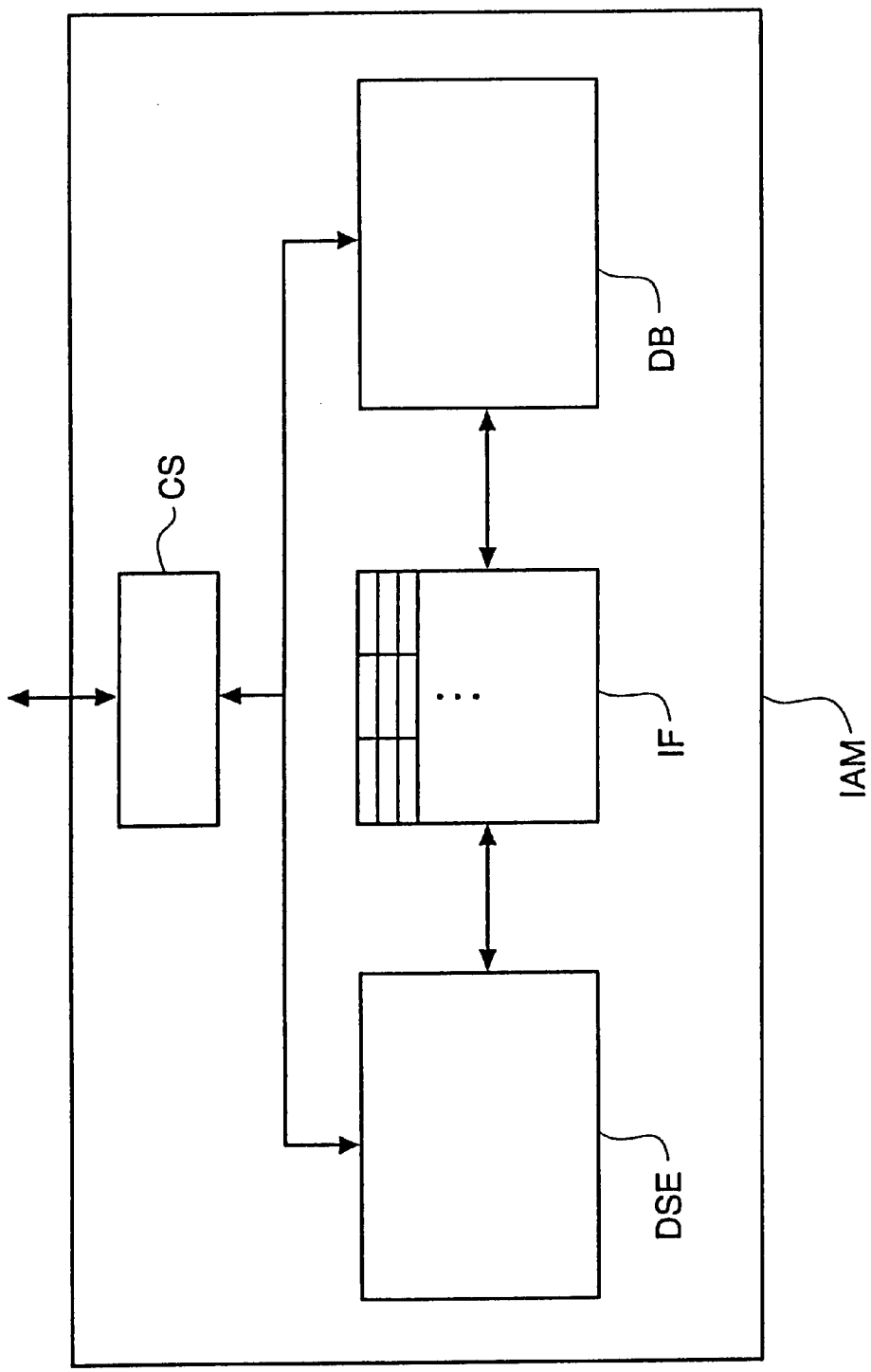
FIG. 2 illustrates in block diagram form additional details of the information access monitor.

The information access monitor system of the present invention is illustrated in block diagram form in FIG. 1, which also shows a typical computer system environment, and in additional detail in FIG. 2. In particular, a common carrier type of communication medium T interconnects a data communication system I, such as Internet, with a computer system H via a gateway element G. The data communication system I comprises a collection of interconnected servers S1–Sm, each of which represents a repository of data, which data can be accessed by users who are served by the data communication system I. This data communication system I can be the Internet, which is the well-known world wide data access system. The computer system H can be any configuration of processors and, in the present description, is illustrated as a processor complex which consists of a plurality of client processors C1–Cn, such as personal computers or workstations, which are interconnected by an "intranet" comprising a local area network LAN. The computer system H can include one or more data storage servers DSS, each of which functions to manage the mass storage function. The data storage server DSS comprises a data storage subsystem which stores data for the collection of client processors C1–Cn in an on-line manner. The configuration and composition of this computer system H can vary greatly and the particular embodiment disclosed herein is for the purpose of illustrating the concepts of the information access monitor IAM, which is shown as connected to the gateway G.

Relevant definitions of terms for the purpose of this description include: information, which is typically electronic in nature and available for access by a user via the Internet I, is termed an "object"; a digitally represented profile indicating an object's attributes is termed an "object profile"; a profile of a user's attributes is termed a "user profile"; a summary of digital profiles of objects accessed by a user and/or noted as of interest to the user, is termed the "interest summary" of that user.

User Access Scenario

In a typical operation, a user at one of the plurality of client processors C1–Cn establishes a communication connection via the local area network LAN to a gateway apparatus G which interconnects the local area network LAN with the data communication medium T that serves to provide communication access to the Internet I. This system configuration and operation is well known and represents the underlying system on which the method and apparatus of the present invention is implemented. The information access monitor system IAM comprises a collection of hardware and/or software which is connected to or part of the computer system H to monitor the communications carried by the gateway G to and from the Internet I. In particular, the system of FIG. 1 illustrates the information access monitor IAM as being connected to the gateway G such that the information access monitor IAM monitors the communication connections that are established between the local area network LAN and the Internet I. However, the information access monitor IAM can reside within the gateway G, rather than being a separate element. Furthermore, the information access monitor IAM can also function to monitor the information which is input to computer system H by other than gateway G. The client processors C1–Cn can receive data from other sources and this information, as received, can be processed by the information access monitor IAM in a manner analogous to that described below for the case of information accessed by means of the Internet.

Information Access Monitor Architecture

The information access monitor IAM monitors information flows between the internal data communication network LAN and Internet I to identify these information requests and responses. The information access monitor IAM generates relevance indexes for these requests and responses and compiles a "corporate consciousness" of all data relevant to the organization. The information access monitor IAM computes user/group profiles to identify information needs and interests within the organization and can then automatically associate users/groups with information of relevance. The users can be advised of information retrieved from the Internet I by others via automated "copy to" lists or can be directed to pertinent information in response to the user seeking information. The information access monitor IAM thereby automatically creates "virtual bibliographies" which reflect topics of interest to the users of the computer system H. These virtual bibliographies are continuously created and updated as needed by the users actions in accessing information through the Internet gateway G.

The function of the information access monitor IAM is to ascertain the identity of users who request and receive information from the Internet I via the gateway G. The identity and, optionally, content of the retrieved information and some content characterizing data is also gathered to provide the information access monitor IAM with sufficient information to determine patterns of information access by the users collectively, individually and as organized communities which have common interests. These determinations are automatically made in a manner that can be devoid of direct user input and knowledge. The information access monitor IAM automatically constructs an "object profile" for each object that is retrieved, a profile of a user's attributes, termed a "user profile" as well as an "interest summary" for each user, which interest summary describes the user's interest level in various types of objects. The information access monitor IAM then compares the object profiles with the users' interest summaries and user profiles to generate a rank ordered listing of objects most likely to be of interest to each user so that the information access monitor IAM can identify which information being retrieved via the gateway G is likely to be of interest to individual users from the plethora of objects available via the Internet I.

In the preferred embodiment of the invention, the information access monitor IAM uses a fundamental methodology for accurately and efficiently matching users and objects by automatically calculating, using and updating profile information that describes both the users' interests and the objects' characteristics. The information delivery process is based on determining the similarity between a profile for the object and the profiles of objects accessed by a user and/or noted as of interest to the user. The individual data that describe an object and constitute the object's profile is herein termed "attributes" of the object. Because people have multiple interests, an interest summary for a single user typically is subdivided into a set of individual user interest summaries, each of which identifies one of the user's areas of interest. Each user is presented with those objects whose profiles most closely match the user's interests as described by the user's interest summary. Users' profiles and interest summaries are automatically updated on a continuing basis to reflect each user's changing characteristics and interests, respectively. In addition, objects can be grouped into clusters based on their similarity to each other, and made available to the users whose profile and/or interest summary match the collections of information. The objects which can be accessed using this architecture are varied in content, format and media. The objects can comprise documents in the form of published news articles, letters, E-Mail messages, technical/scientific papers, product specifications and the like. The objects can also comprise video information, such as movies, news clips, live feeds and the like, or graphics, such as advertisements, web pages and the like. Other object formats and contents as well as combinations of formats and contents are possible, and can be accessed using the concepts of the information access monitor. For the purpose of simplicity of description, the objects described herein are selected to be documents, which are presently readily available from the Internet I.

The architecture of the information access monitor IAM is illustrated in block diagram form in FIG. 2. In particular, the information access monitor IAM consists of a plurality of elements which function to perform the above-noted object access monitoring functions. These elements comprise a document search engine DSE which functions to identify an object, its content, and characteristics. The index data generated by the document search engine DSE is stored in an index file IF for subsequent searching and retrieval. In addition, a database DB is provided to generate and store information relating to the user profiles and user interest summaries. The database DB can store the data in the same index file memory IF as the document search engine DSE or can maintain an independent memory for its purposes. The information access monitor IAM can include additional control software CS to implement the information monitoring and dissemination functions, which control software CS operates in conjunction with the document search engine DSE and database DB.

Document Search Engine

The document search engine DSE is shown as part of the information access monitor IAM, but can alternatively be incorporated into the existing gateway G or implemented as a plurality of distributed processes resident on the server processors S1–Sm. The document search engine DSE functions to index the full text and properties of objects (typically documents) which are stored on a data storage subsystem to thereby enable a user to locate objects of interest. ActiveX™ Search is a document content indexing and searching system which is commercially available from Microsoft Corporation and which can be used to implement the document search engine DSE. In addition, the Internet Access Server is an Internet access system which is commercially available from Microsoft Corporation and which can be used to implement the basic gateway G.

In presently available systems, the document search engine DSE resides on server, such as server processor S1, and enables a client, such as client processor C1, to formulate queries, using any World Wide Web browser, simply by filing in the fields of a simple web query form. The web server located at the client processor C1 forwards the completed query form to the query engine located on the server processor S1, which then locates any pertinent documents stored on the server processor S1 and forwards results to the client processor C1, in the format of a web page. This capability of the software enables a user to create simple query forms.

In contrast to this configuration, the document search engine DSE as shown in FIG. 2 resides on the information access monitor IAM, and functions to index the full text and properties of objects which are stored in the computer system H. This is accomplished by storing any object retrieved from the server processors S1–Sm in a buffer memory (not shown) in the gateway G prior to distribution to the requesting user. While the object is stored in the buffer memory, the document search engine DSE processes the object to generate a set of indexes for this object. These indexes are stored in index file IF and the physical data storage location on client processor C1 or data storage subsystem DSS is also noted to enable subsequent retrieval of the stored object. Alternatively, the source of the object (such as one of the server processors S1–Sm) can be noted to enable the gateway G to simply retrieve the object from its originating server processor. Alternatively, the document search engine DSE can be implemented in a distributed fashion, on each of the data storage subsystems DSS and client processors C1–Cn which are interconnected to the local area network LAN. In this implementation, the query processing and index storage can be implemented in each distributed processor and the results forwarded to the information access monitor IAM or the indexes can be centrally stored on the information access monitor IAM and the queries processed therein. In either application, the information access monitor IAM functions to directly catalog or direct the cataloging of objects (documents) which are stored in the computer system H on the various client processors C1–Cn and data storage subsystems DSS located therein.

Document Indexing

The basic document indexing strategy is implemented on a directory basis, where all of the documents stored in a directory and all of its subdirectories are indexed. The index is updated as new documents are modified and/or added to or deleted from the directory. This capability enables the incremental updating of the index on a dynamic basis. The query system is therefore localized and is also modular, in that the query system can load modules to index documents that are authored in different languages, multiple languages, or are formatted in different media types. The query system can be the ActiveX™ Search software, available from Microsoft Corporation, which includes word breakers, stemmers, and normalizers to provide this capability. The resultant query indexes are stored by the ActiveX™ Search software as Unicode characters and all queries are converted to Unicode before being executed.

The index update capability is automatically operated, since the document search engine DSE is registered with the file system to automatically receive notification of any data file modifications within the directories covered by the index operations. The incremental indexing is performed as a background operation to minimize the impact on the processor load. The basic indexing operation comprises three steps, noted above as: filtering, word breaking, and normalization. The first step in any indexing process is the content filtering. Since documents are typically stored in a file format which is transparent to the system, yet in a format which is specific to the particular process which created the document. Thus, Microsoft® Word™ text documents are stored in a format which differs from a text document generated by Corel® WordPerfect™. The document search engine DSE uses content filters to index these unique file formats by excerpting text elements from the identified file and exporting the text to document search engine DSE in a format which document search engine DSE recognizes. The content filter also monitors the document for language changes, which results in the content filter emitting a language tag which identifies the new language, as well as the text written in this language. The content filter operates only on a specific source file format and therefore, the capability of the system can be expanded to account for new source formats by the addition of content filters designed specifically for the new file format. Once the content filter has operated on the source file, the word breaker step is activated to divide the received text stream from the content filter into words and phrases. Thus, the word breaker accepts a stream of characters as an input and outputs words. As with the content filters, word breakers are created for each application (language) and can be added to the system on a modular basis. The final step of indexing is the normalization process, which removes "noise" words and eliminates capitalization, punctuation, and the like. Noise words (such as "the", "of", and the like) typically comprise 50% of the text of a document and their removal greatly reduces the index overhead. The output of the normalization process consists of a set of words which comprise the index for this document.

The Query Process

Figure 3:
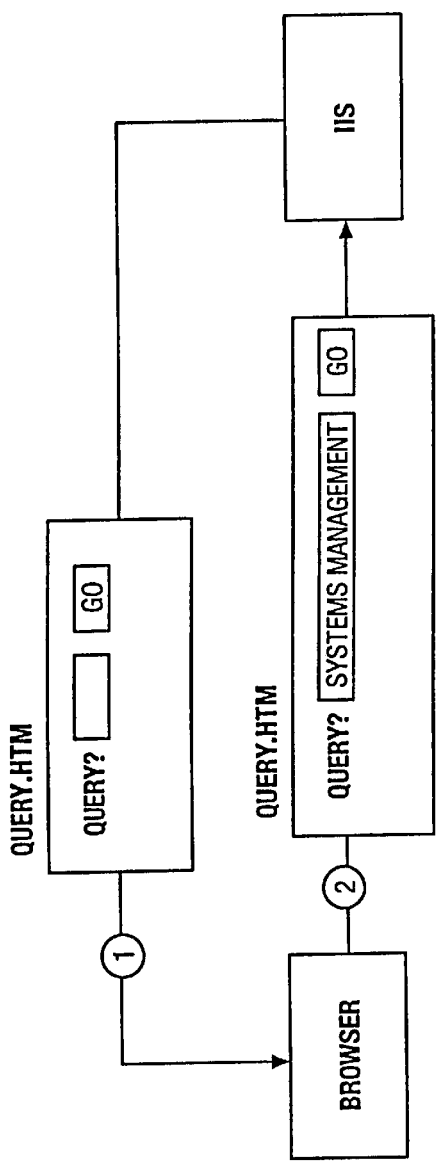
FIGS. 3–5 illustrate in block diagram form the various elements of the information access monitor and the data flows therebetween.
Figure 4:
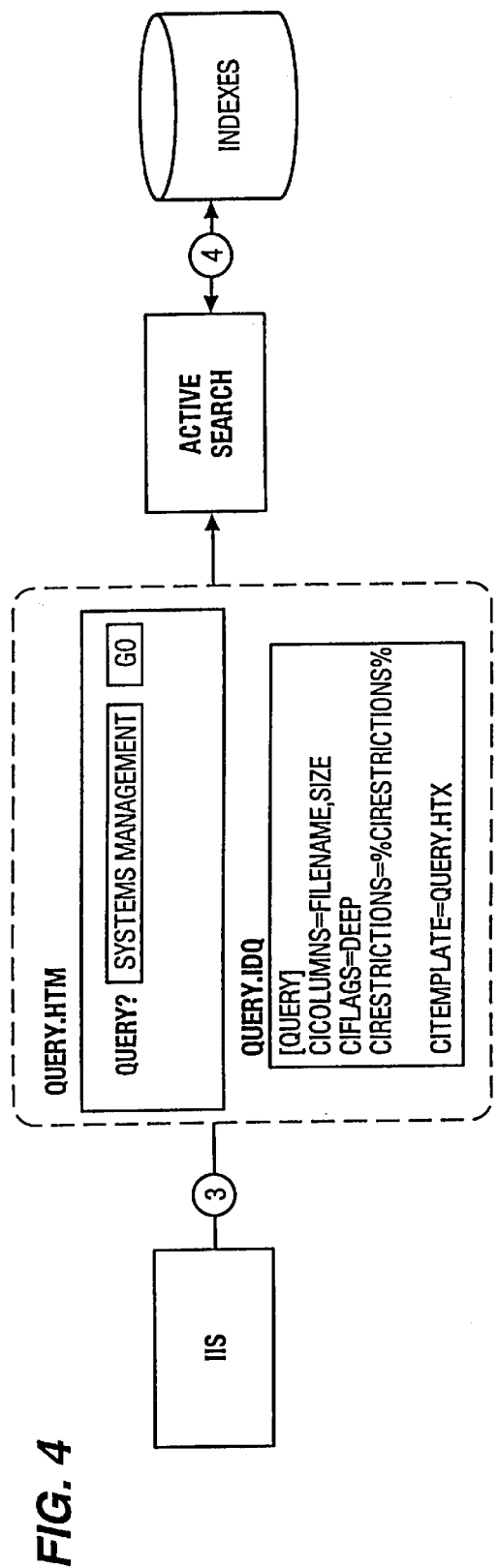
Figure 5:
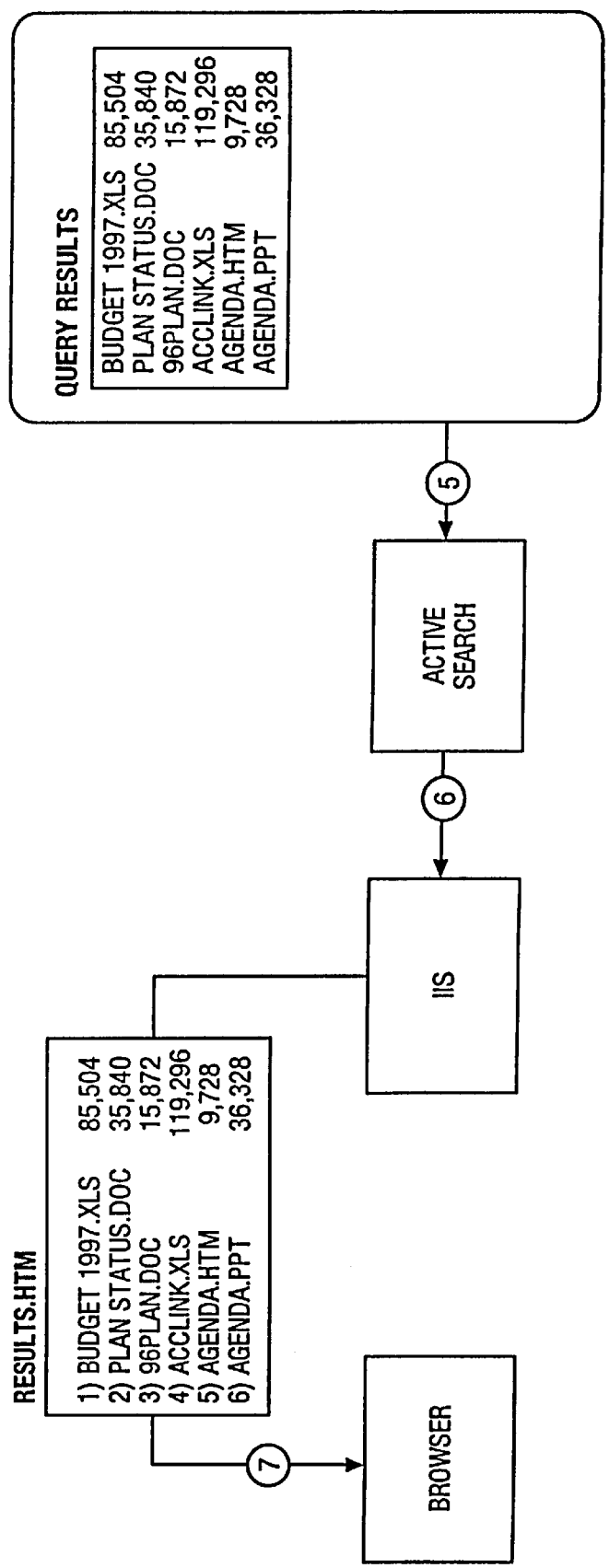

The document search engine DSE process is independent of the Internet web and gateway G, while the query process interacts with the gateway G. This is because the query is user driven and works with the gateway G to accept and process queries and return results. The document search engine DSE converts Internet queries into a query form that is compatible with document search engine DSE indexes. The document search engine DSE program then executes the query and converts the results of the search into a form that is compatible with the source, that is a web page, which is returned to the user. This process is illustrated in FIGS. 3–5. In particular, in FIG. 3, the gateway G provides a query.htm file, which represents the query screen, to the Internet browser which is active on the client processor C1. The query screen allows a user to express a query by simply filling out fields in a form. The form as shown in FIG. 4 is completed and represents a request for all documents which contain the phrase "systems management" within the bounds of the document. The option fields, located on the screen below the query field, show that this user wants the results sorted in descending order by rank, with ten document references per page. The user wants the results presented in the form of: document title, abstract, link (URL) that points to the document, document size, date of last update. The user activates this query by pointing and clicking on the "Execute Query" button icon on the display. The user receives a display of the query screen on the terminal device at which the user is active and the user inputs the query data into the fields which are available in the query screen. The Internet browser, in response to the user completing the query screen and clicking on the "Execute Query" button icon on the display, transmits the completed request to the gateway G. The gateway G processes the received query form as shown in block diagram form in FIG. 4. The information access monitor IAM supplies the file query.htm which invokes the query.idq file when the user completes the entries in the query screen. The query.idq file is then executed by the document search engine DSE to produce the results which are formatted using the user defined format of query.htx. The document search engine DSE transmits these results to the gateway G which processes the received files to generate a results.htm file, which is in the form of a web page display driver. The gateway G transmits the results.htm file to the Internet browser on the requesting client processor C1, where the results.htm file are displayed on the user's terminal device.

User Query Processing

Figure 6:
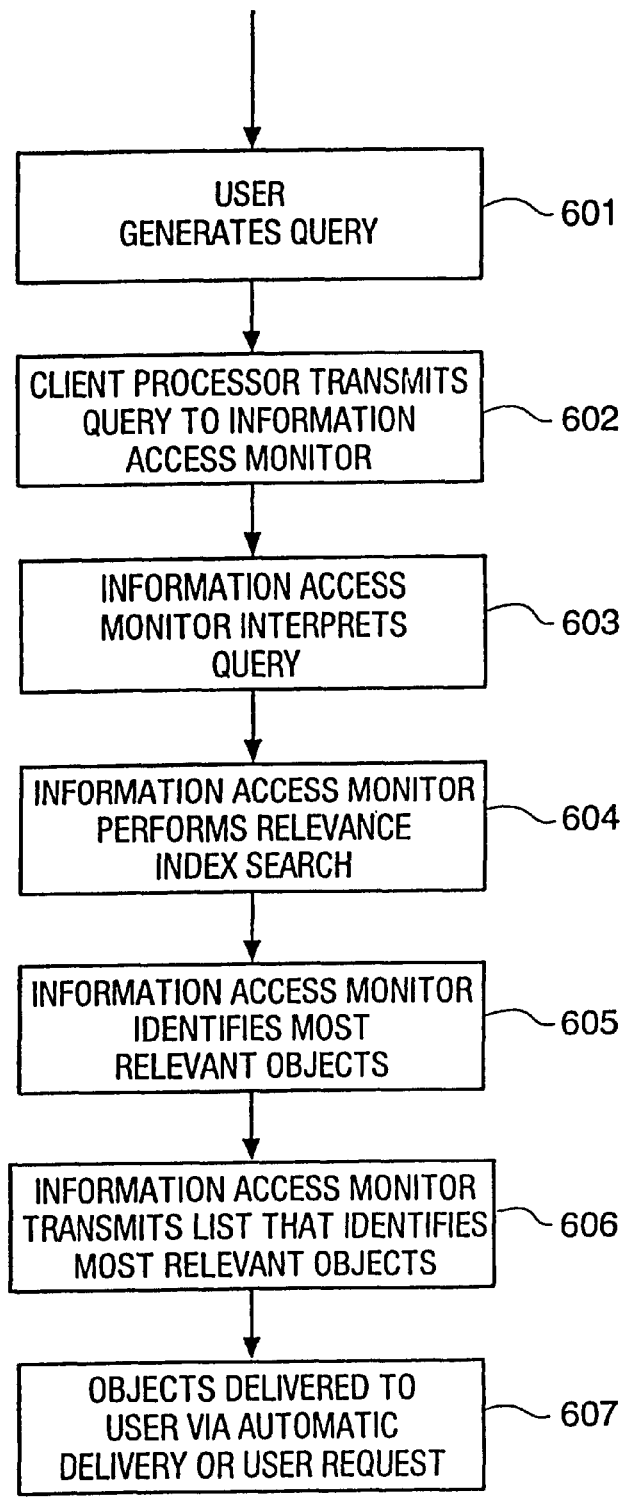
FIG. 6 illustrates in flow diagram form the operational steps taken by the information access monitor to perform its functions.

FIG. 6 illustrates, in flow diagram form, the processing of a typical user query request. The user at step 601 generates a query on the user's client processor, such as client processor C1, as described above. This generated query is transmitted at step 602 by the client processor C1 via local area network LAN to the information access monitor IAM via the gateway G. The information access monitor IAM intercepts the query at step 603 and interprets the query. The information access monitor IAM, at step 604, uses the relevance index information stored in the index files IF to process the request and identify the ones of the objects previously indexed by document search engine DSE which match the relevance index information stored in index files IF. This is accomplished by performing an object relevance determination based upon the identity of the user requesting the information, the user's profile and user's interest summary indexes stored in the database DB, and other user profile criteria, administrative criteria, and object characterizing data. The result of the relevance index searches are used at step 605 by the information access monitor IAM to generate a response to the requesting user, which response is in the format and content requested by the user. The information access monitor IAM, at step 606, transmits data to the requesting user to identify the objects which were identified in the query processing step. The information access monitor IAM at step 607 can either push data to the requesting user or can respond to users requesting data.

Automatic Information Dissemination

The information access monitor IAM stores index data in index file IF which is indicative of the identity, content, and characteristics of the objects which are stored in computer system H and/or accessed by users of computer system H and stored on the server processors S1–Sm of the Internet I. This index information provides the information access monitor IAM with the data to enable it to identify objects retrieved by users which may be of interest to other users of computer system H. This index information can be ordered in a number of ways, depending on the functionality which is desired on computer system H.

A first capability is for the index information to be maintained in a quiescent mode, where it is only used when a searching user initiates a query for objects which match a searcher provided query, as described above. The information access monitor IAM receives the query, and then provides an initial listing of objects which satisfy the searcher's query parameters. The user terminates the search at this juncture, or can further transmit the query to the Internet I to supplement the list provided by the information access monitor IAM. The additional responses obtained from the Internet I are then individually indexed by the information access monitor IAM as described above.

A second mode of operation of the information access monitor IAM is where the information access monitor IAM is used to automatically call the identified objects to the attention of a user. Thus, the information access monitor IAM generates the correspondence lists and automatically propagates these lists to identified users who may have an interest in the identified objects. This propagation function can be implemented on an object basis, where each new object indexed by the document search engine DSE is propagated to users of computer system H as a result of the index generation for the newly received object. Alternatively, the list update can be a periodic function, which can be implemented in a background manner. Various hybrid modes can be implemented or different modes can be assigned for different categories of objects for each user.

The operation of the information access monitor IAM in an automatic object propagation mode requires the identification of correspondence between the identity, and/or content, and/or characteristics of received objects and the users' profile and/or interest summaries. The correspondence function is a well-known operation and is described in general fashion below to illustrate the concepts embodied in such a system. The correspondence function can be implemented in whole or in part in the control software CS in the information access monitor IAM. The control software utilizes the object index information stored in the index files IF and the user profiles and user interest summaries stored in database DB. Additional relevant information can be stored in the index files and/or the database, which enhance the correspondence function. The additional information can comprise user generated annotations which are transmitted by the user to the information access monitor IAM to annotate the retrieved object or even the user profile and/or user interest summaries. The information access monitor IAM, in response to a received annotation, verifies the validity of the annotation and stores the annotation in the database DB. Annotations can be index data, copy to lists, storage parameters, or contextual data. Indexing information that is stored in the index files IF can also be keywords, object source identification, identification of requestors, date of access, duration of access, date of last access to or update of an object, and the like. The control software CS can use the annotations and index data, since they are stored in database DB, to generate audit trails in well known fashion, which enables the system and system administrators to determine patterns of information flow and various data access and usage measurements. This capability also provides for the storage and organized retrieval of annotation information which relates to a particular object.

Similarity Measures

In determining whether a received object is of potential interest to a user, a relevance determination must be performed. Such a relevance operation can be a similarity measure determination. Objects are considered to be similar if the distance between their respective object profiles is small according to some metric. The attributes that are typically used to make this determination are: numeric, textual, and associative. In the classical information retrieval problem, where the objects are documents, the system might only consider a single, textual attribute when measuring similarity: the full text of the object. However, a more sophisticated system considers a longer object profile, including numeric and associative attributes. For example, the distance between two values of a given attribute can be computed according to whether the attribute is a numeric, associative, or textual attribute. If the attribute is numeric, then the distance between two values of the attribute is the absolute value of the difference between the two values. If the attribute is associative, then its value V may be decomposed into a collection of real numbers, representing the association scores between the object in question and various ancillary objects. The value V may therefore be regarded as a vector with components $<V_1, V_2 \ldots V_{m>}$. Regardless of the implementation of the process, a similarity measure function determines how close a received object is to previously received objects.

Determining Topical Interest Through Similarity

Relevance feedback only determines the user's interest in certain objects: namely, the objects that the user has actually had the opportunity to evaluate. For objects that the user has not yet seen, an object filtering system must estimate the user's interest. This estimation task is the heart of the filtering problem, and the reason that the similarity measurement is important. The evaluation of the likelihood of interest in a particular object for a specific user can automatically be computed. The computation process begins where certain designated numeric attributes of an object are specifically selected, which attributes by their very nature should be positively or negatively correlated with users' interest.

It is possible and often desirable for a filtering system to store a different set of weights for each user. Attribute weights (of both sorts) may be set or adjusted by the system administrator or the individual user, on either a temporary or a permanent basis. However, it is often desirable for the filtering system to learn attribute weights automatically, based on relevance feedback. The optimal attribute weights for a user are those that allow the most accurate prediction of user's interests.

Searching for Objects

The control software CS uses the above-noted processes to automatically identify objects which are potentially of interest to users. The control software receives the object profile data for a newly received object, and processes this data to determine the relevance of this object to the users served by computer system H. The control software CS processes the user profile indexes and the user interest summary indexes stored in the database DB to compute the correlation between these indexes and the indexes computed for the received object. If the correlation between these two sets of indexes exceeds a predetermined threshold, then the received object is noted as being of potential relevance to the selected user. At this juncture, the control software CS can store this information for later recall when the selected user initiates a query, or control software CS can transmit information to this selected user to actively identify this received object as being of possible interest. In either case, the control software CS operates independent of the users and functions to anticipate their need for information.

Monitor Which Articles are Read

The information access monitor IAM must maintain current data relating to the interests of the users who are served by the computer system H. To accomplish this task, the information access monitor IAM monitors which objects are accessed by the users, keeping track, for example, of how many pages of text of an article are viewed by the user, how much time is spent viewing the article, and whether all pages of the article were viewed. This information can be combined to measure the depth of the user's interest in the article, yielding a passive relevance feedback score. The computed measure of article attractiveness can then be used as a weighting function to adjust the user's interest summaries to thereby more accurately reflect the user's dynamically changing interests.

Summary

The information access monitor monitors information flows between the internal data communication network and Internet to identify information requests and responses. The Information Access Monitor generates relevance indexes for these requests and responses and compiles a "corporate consciousness" of all data relevant to the organization. The information access monitor computes user/group profiles to identify information needs and interests within the organization and can then automatically associate users/groups with information of relevance. The users can be advised of information via automated "copy to" lists or can be directed to information in response to the user seeking information. The information access monitor thereby automatically creates "virtual bibliographies" which reflect topics of interest to the users of the system. These virtual bibliographies are continuously created and updated as needed by the users.

What is claimed:

1. In an organization having multiple members and an internal data communications network through which the multiple members can access and retrieve objects from the Internet, a method for enhancing efficiencies with which objects retrieved from the Internet are maintained for access by the multiple members, the method comprising:

monitoring information flows between the internal data communications network and the Internet, the monitoring identifying information requests for objects from one or more of the multiple members and responses from the Internet that contain requested objects;

ascertaining the identities of individual members who request and receive objects from the Internet;

determining patterns of information access for one or more of the multiple members;

constructing an object profile for individual objects that are retrieved from the Internet;

developing a listing of one or more objects that are retrieved from the Internet that are likely to be of interest to individual members who did not request the one or more objects, the list being developed by considering object profiles and member patterns of information access; and presenting the listing to at least one member of the organization.

2. The method of claim 1 further comprising storing objects retrieved from the Internet in an organization storage sub-system, wherein the listing references objects that are stored in the organization storage sub-system.

3. The method of claim 1 further comprising noting the source of the objects so that a member can be notified as to where an object can be obtained.

4. The method of claim 1, wherein the constructing of the object profile comprises indexing properties of objects to create entries in an index file that is maintained by the organization.

5. In an organization having multiple members and an internal data communications network through which the multiple members can access and retrieve objects from the Internet, a method for enhancing efficiencies with which objects retrieved from the Internet are maintained for access by the multiple members, the method comprising:

cataloging objects as they are retrieved from the Internet by one or more of the multiple members of the organization, said cataloging being performed by an information access monitor that is positioned at an organization gateway to the Internet through which objects retrieved from the Internet pass;

storing copies of objects in a organization storage sub-system;

constructing an object profile for individual objects that are stored in the storage sub-system;

determining, based upon member profiles and object profiles, which objects stored in the organization storage sub-system might be of interest to other members of the organization who did not cause the objects to be retrieved; and notifying the other members of objects that might be of interest to them.

6. The method of claim 5, wherein the cataloging takes place on a directory basis, where individual objects that are stored in one or more organization directories or sub-directories are cataloged.

7. The method of claim 6, wherein a catalog is updated as new objects are added to or deleted from a directory.

8. In an organization having multiple members and an internal data communications network through which the multiple members can access and retrieve objects from the Internet, a method for enhancing efficiencies with which objects retrieved from the Internet are maintained for access by the multiple members, the method comprising:

maintaining index data in an index file, the index data being indicative of objects that are obtained by individual members of the organization from the Internet;

storing objects for which index data is maintained within an organization's internal data communications network storage sub-system;

receiving a member-generated query for one or more objects that can be obtained from the Internet;

executing the member-generated query internally of the organization by using the index file to identify objects that were previously obtained by one or more other members of the organization; and generating a response to the member from which the query was received that contains indicia of any stored objects that satisfy the member-generated query.

9. The method of claim 8, wherein index data is maintained in a quiescent mode where it is only used when a member initiates a query for objects.

10. The method of claim 8, wherein the index data is maintained in an automatic mode in which lists that describe objects are automatically generated and propagated to members who may have an interest in various objects.

* * * * *

UNITED STATES PATENT AND TRADEMARK OFFICE
CERTIFICATE OF CORRECTION

PATENT NO.     : 6,336,956 B1
DATED          : April 2, 2002
INVENTOR(S)    : Krishnan It is certified that error appears in the above-identified patent and that said Letters Patent is hereby corrected as shown below:

Column 1,
Line 10, replace "users-" with -- user's --.

Column 6,
Line 15, insert -- a -- between "on" and "server".

Signed and Sealed this

Eighteenth Day of February, 2003

JAMES E. ROGAN
*Director of the United States Patent and Trademark Office*